Patented May 10, 1927.

1,628,163

UNITED STATES PATENT OFFICE.

HANS LILLEJORD, OF TRONDHJEM, NORWAY, ASSIGNOR TO A/S NORSK KJELER-ENSNINGSMIDDEL IDEAL, OF KIRKEGATEN, OSLO, NORWAY.

PURIFYING COMPOSITION FOR COUNTERACTING THE FORMATION OF SCALE IN BOILERS.

No Drawing. Application filed April 10, 1926. Serial No. 101,205.

At present many different substances, compositions and mixtures are used with a view to prevent or counteract the formation of scale in boilers. In the most cases the principal constituent is calcined soda alone or caustic soda and calcined soda, and sometimes also lime is used. These substances have the effect of precipitating in the water the dissolved salts of calcium and magnesium. In combination with the said precipitating substances also different other substances are used, and the latter have for their purpose essentially to prevent the separated substances form settling upon the boiler pipes or upon the heating surfaces of the boiler. Among substances of this sort wood-dust, starch, organic arseno compounds, etc., have been proposed.

In all combinations of mixed constituents hitherto used as a boiler purifying composition certainly the most part of the dissolved substances are precipitated, but the same were not fully prevented from settling as scale or incrustation, and their dissolving effect upon scale already formed is minimal. This obviously is due to the fact that one has not experimented to a sufficient degree to be able to substantiate which of the substances is especially suitable for separating the substances dissolved in the water and which of them is of such a nature that it will cooperate favourably with those constituents which prevent the separated substances from settling as scale or incrustations.

By the present invention I have succeeded in manufacturing a purifying composition which, besides separating the substances dissolved in the water, also prevents the said substances completely from settling as scale, and at the same time the advantage is obtained that the scale already existing is dissolved and sedimented.

Experience has shown, namely, that the two well-known constituents of a boiler purifying composition, viz: caustic soda and calcined soda, cooperate especially well by using the well-known quebracho, for preventing the substances dissolved in the boiler water from settling upon parts within the boiler, and the alkali salts formed by such cooperation will simultaneously have the effect of loosening and sedimenting old scale existing in the boiler.

By means of experiments carried on for a long time it has been discovered that the necessary and intended effect or combined action of the several constituents of the present scale preventing and removing compositions is obtained more safely, by using the substances in the following proportions: 25–35 parts by weight of caustic soda, 7–10 parts by weight of sodium carbonate, 0, 8–1, 2 parts by weight of quebracho, which mixture is added to 80–130 parts by weight of water.

Claims:—

1. A purifying composition for counteracting the formation of scale in boilers which consists of caustic soda, sodium carbonate, and quebracho in a water solution.

2. Purifying composition for counter-acting the formation of scale in boilers and for removing existing incrustations consisting of caustic soda, sodium carbonate, quebracho and water in the following proportions: 25–35 parts by weight of caustic soda, 7–10 parts by weight of sodium carbonate, 0, 8–1, 2 parts by weight of querbracho, 80–130 parts by weight of water.

In testimony whereof I affix my signature.

HANS LILLEJORD.